June 24, 1952     J. S. KISH     2,601,401
AUTOMOBILE BUG DEFLECTOR
Filed May 7, 1951
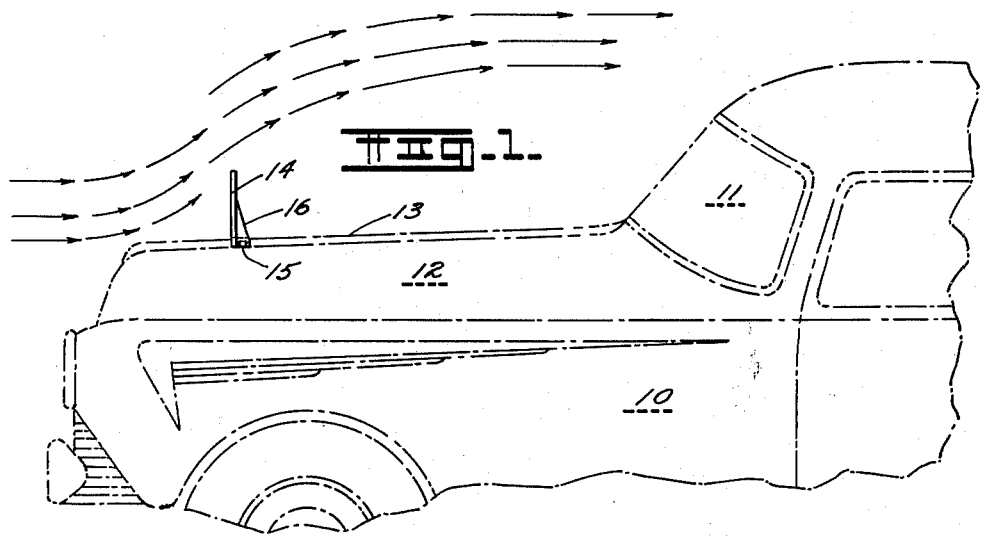
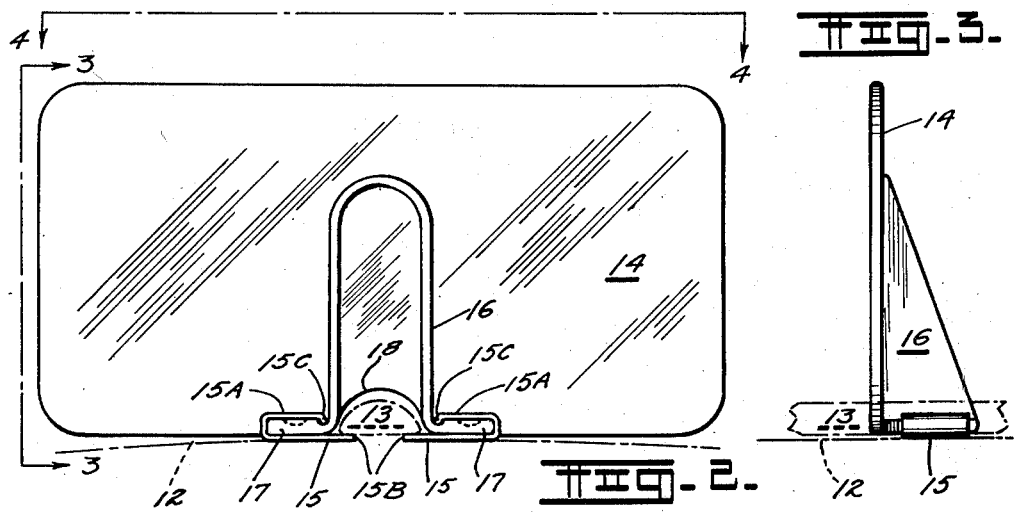
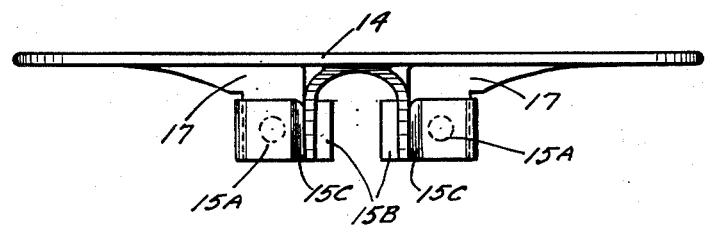
INVENTOR.
John S. Kish.
BY
W. B. Hartman
ATTORNEY.

Patented June 24, 1952

2,601,401

UNITED STATES PATENT OFFICE 2,601,401

AUTOMOBILE BUG DEFLECTOR

John S. Kish, Youngstown, Ohio, assignor to Emanuel E. Evans, Poland, Ohio

Application May 7, 1951, Serial No. 224,963

5 Claims. (Cl. 296—91)

This invention relates to a bug deflector for positioning on the hood of an automobile in front of the windshield for deflecting air currents.

The principal object of the invention is the provision of a bug deflector which may be secured to the ornamental moulding strip on the hood of an automobile.

A further object of the invention is the provision of a bug deflector which may be moulded of a single piece of suitable plastic material and provided with a pair of metal clamping pieces registrable beneath the ornamental moulding strip on the hood of an automobile.

A still further object of the invention is the provision of an improved clamp for a bug deflector with respect to the clamping means disclosed in my Patent No. 2,515,604, issued July 18, 1950.

The present invention relates to an improved bug deflector and specifically in the means attaching the bug deflector to the ornamental moulding strip running longitudinally of the hood of an automobile. A bug deflector of general size and shape of that disclosed herein is shown in my Patent No. 2,515,604, issued July 18, 1950, and which bug deflector has proven the utility of the idea in general in that it has become commercially successful and widely used for the indicated purpose. The bug deflector in my aforementioned patent is clamped to the ornamental moulding on the hood of an automobile forwardly of the windshield by means of an inverted U-shaped clamp, the arms of which are inturned at their lowermost ends for engagement beneath the moulding strip on the automobile hood or for engagement around the ornament on the hood of an automobile. The present invention contemplates a modification of this structure in that the U-shaped clamp portion is formed integrally with the moulding plastic sheet of the bug deflector and the inturned lower end portions thereof are formed separately and frictionally affixed to the moulded part and so arranged in oppositely disposed relation to one another that they may be positioned beneath the moulding strip on the hood of an automobile thereby securing the bug deflector in position in front of the windshield where it is useful in deflecting air currents, bugs and snow and the like carried by such air currents and thereby avoids the impingement of such objects with the windshield.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of the front portion of an automobile showing the bug deflector in position on the hood thereof.

Figure 2 is a rear view of the bug deflector.

Figure 3 is a side view of the bug deflector.

Figure 4 is a top view of the bug deflector.

By referring to the drawings and Figure 1 in particular it will be observed that an automobile generally indicated by the numeral 10 is partially illustrated and includes a windshield 11. The hood 12 extends forwardly from the windshield 11 as is customary and is provided with a longitudinally extending, centrally located moulding strip 13. A bug deflector comprising a deflector portion 14 preferably formed of transparent plastic material is positioned vertically on the hood 12 transversely of the moulding strip 13 and forwardly of the windshield 11 by means of a pair of oppositely disposed inturned clamps 15 as best shown in Figures 2, 3 and 4 of the drawings.

The deflector portion 14 is preferably formed as a rectangular moulded section of transparent plastic material having a rearwardly extending inverted U-shaped member 16 integrally formed therewith and preferably tapered from a narrow uppermost portion to a relatively wide lowermost portion as best shown in Figure 3 of the drawings. The lowermost portion of the inverted U-shaped member 16 is formed in two oppositely disposed outturned ends 17 which are also integrally formed with the inverted U-shaped body member 16 and the deflector portion 14 and the material of the deflector portion 14 is cut away in an arcuate notch 18 between the inner surfaces of the inverted U-shaped body member 16 so that clearance is provided with respect to the moulding strip 13 on the automobile hood 12 heretofore referred to.

It will thus be observed that the structure now described can be moulded in a single piece of a suitable plastic material and at relatively low cost and that the structure may be positioned on the hood of an automobile straddling the longitudinally extending ornamental moulding thereon. In order that this structure may be secured to the hood of an automobile and specifically the ornamental moulding 13, the pair of clamps 15 are provided, each of which is of modified U-shape in side elevation, as shown in Figure 2 of the drawings, and each of which is formed with one of the arms of the U relatively shorter than the other. In the drawings the shorter arms are indicated by the numerals 15A and the outermost ends of the longer arms by the numerals 15B. The clamps 15 are positioned on the ends 17 so that they envelop the outturned portions thereof with the short arms 15A lying on top of the ends 17 and the longer arms 15B lying beneath the ends 17 and extending inwardly beneath the ornamental moulding strip 13.

The innermost ends of the arms 15A are downturned as shown at 15C and are adapted to register with grooves formed in the ends 17 of the inverted U-shaped body member 16. The clamps 15 are thus capable of retaining themselves in position on the ends 17 and additionally the ends 17 may be provided with openings in their uppermost surfaces into which portions of the clamps 15 may be indented if desired.

It will occur to those skilled in the art that in positioning the bug deflector on an automobile hood it is necessary to loosen the moulding strip 13 with respect to the hood after which the deflector portion 14 is positioned transversely thereof and the clamps 15 positioned partially beneath the loosened moulding strip 13 and then slid into position over the ends 17 of the inverted U-shaped body member 16 after which the ornamental moulding strip 13 is again tightened thereby holding the bug deflector securely in position on the hood.

It will thus be seen that a simple and efficient means of mounting a bug deflector on the moulding strip of the hood of an automobile has been disclosed and which means may be more economically formed than the clamping means shown in my aforesaid patent.

Having thus described my invention, what I claim is:

1. The combination of an automobile having a windshield and a hood in front thereof and an ornamental moulding on said hood, a sheet of transparent plastic material and means for mounting the same in approximately vertical position transversely of the hood and spaced in front of said windshield and on said ornamental moulding, said sheet of transparent material having a centrally disposed rearwardly extending inverted U-shaped member, the ends of which are outturned, said means comprising a pair of clamps of general U-shape, one of the arms of each of the clamps being longer than the other and said clamps engaged upon said outturned ends with the longer arms extending inwardly for registry beneath the ornamental moulding.

2. A bug deflector for attachment to an automobile hood having an ornamental moulding thereon and extending longitudinally and centrally of the sides thereof, said bug deflector including a sheet of material having a rearwardly projecting inverted U-shaped member formed integrally therewith, the lower ends thereof of which are outturned, and means for mounting said sheet of material on said ornamental moulding, said means comprising a pair of clamps one of which is engaged on each of said outturned ends and each of which includes an inwardly extending portion for registry beneath said ornamental moulding and supporting said sheet in approximately vertical relation thereabove and transversely with respect to said moulding and hood.

3. The bug deflector set forth in claim 2 and further characterized by the formation of the sheet of material and the U-shaped body member thereon of transparent flexible material.

4. The bug deflector set forth in claim 2 and further characterized by the formation of the clamps as flattened semi-U-shaped members, one of the arms of each of which is longer than the other, said clamps disposed on the outturned ends of the U-shaped body member with the longer arms disposed therebeneath and for registry beneath the ornamental moulding.

5. The bug deflector set forth in claim 2 and further characterized by the formation of the clamps with portions thereof registering with portions of the outturned ends of said body member portion of the deflector to secure the same against removal therefrom.

JOHN S. KISH.

No references cited.